United States Patent [19]

McGann, Jr.

[11] 3,899,161
[45] Aug. 12, 1975

[54] EGG CUTTING BOARD
[76] Inventor: John J. McGann, Jr., 1204 Tarball St., New Smyrna Beach, Fla. 32069
[22] Filed: May 13, 1974
[21] Appl. No.: 469,340

[52] U.S. Cl. ............... 269/13; 269/296; 269/321 W
[51] Int. Cl.² ........................................ B25B 11/00
[58] Field of Search .......... 269/13, 289, 296, 302.1, 269/321 W; 99/537

[56] References Cited
UNITED STATES PATENTS
1,205,993  11/1916  Higert ............................... 269/289
3,030,994  4/1962  Wysowski ........................... 269/13
3,116,770  1/1964  Tanuma ............................. 99/537

FOREIGN PATENTS OR APPLICATIONS
99,444  10/1898  Germany ........................... 269/289

Primary Examiner—Granville Y. Custer, Jr.
Assistant Examiner—Mark S. Bicks
Attorney, Agent, or Firm—Shoemaker and Mattare

[57] ABSTRACT

An egg cutting board includes a base having a substantially flat upper surface, with at least a pair of spaced apart depressions therein having a shape and size substantially complemental to the shape and size of one end half of an egg, and a plurality of upstanding egg supporting projections are disposed between the pair of depressions for supporting an egg, whereby when the egg is cut a half thereof falls into each of the depressions to thus simplify removal of boiled eggs from their shells with little or no loss of yolk, and also providing a holder from which eggs may be eaten directly out of the half shells.

6 Claims, 3 Drawing Figures 3,899,161

EGG CUTTING BOARD

BACKGROUND OF THE INVENTION

This invention relates to kitchen utensils, and in particular, relates to a holder for holding eggs and the like whereby the eggs and the like may be cut and a half thereof will fall into a depression in the holder.

A hard boiled egg can be removed from the shell by cracking the shell and peeling it off. However, this is not practical when the egg is hot, since it is difficult to hold. Moreover, a soft boiled egg is difficult to cut according to conventional methods, and a substantial amount of the egg yolk may be lost. Moreover, if the egg is cooked through so that the yolk is hard, the egg can be cut on a table and the interior of the egg removed with a spoon. However, the egg tends to roll around on the table top and this procedure is thus less than satisfactory.

OBJECTS OF THE INVENTION

Accordingly, it is an object of this invention to provide a means of cutting a hard or soft boiled egg and the like so that little or no yolk is lost.

Another object of the invention is to provide a holder for securely holding a hot boiled egg so that the egg may be cut to gain access to the interior thereof with little or no loss of the egg yolk and without requiring a hot boiled egg to be held with the fingers.

DETAILED DESCRIPTION OF THE INVENTION

Figure 1:
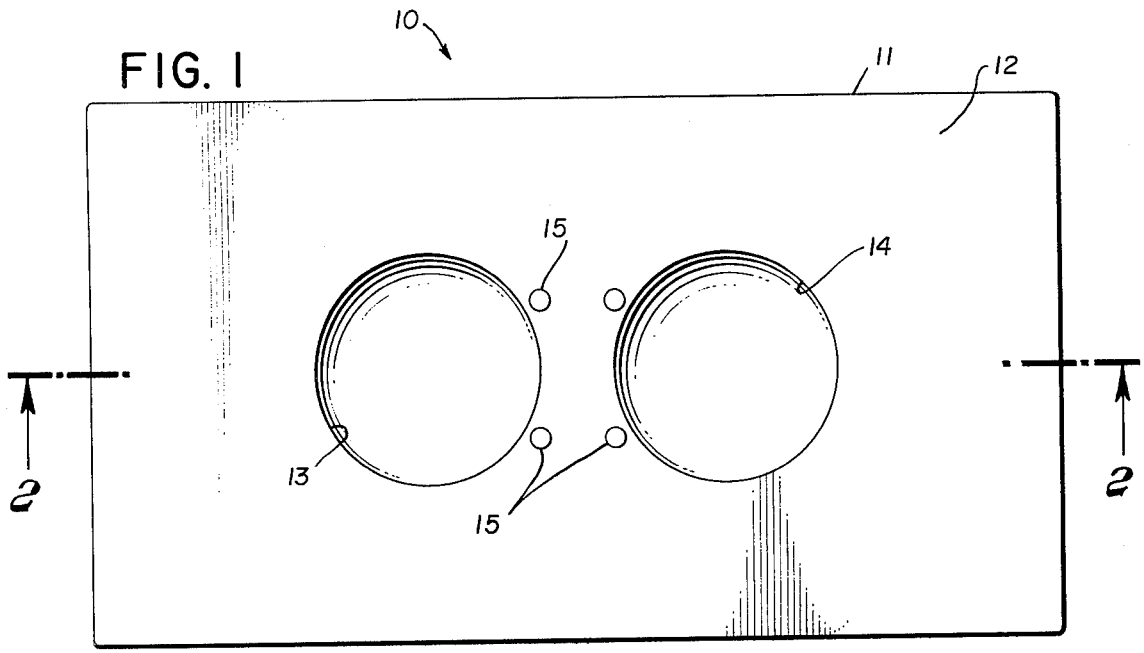
FIG. 1 is a top plan view of one form of egg holder according to the invention.
Figure 2:
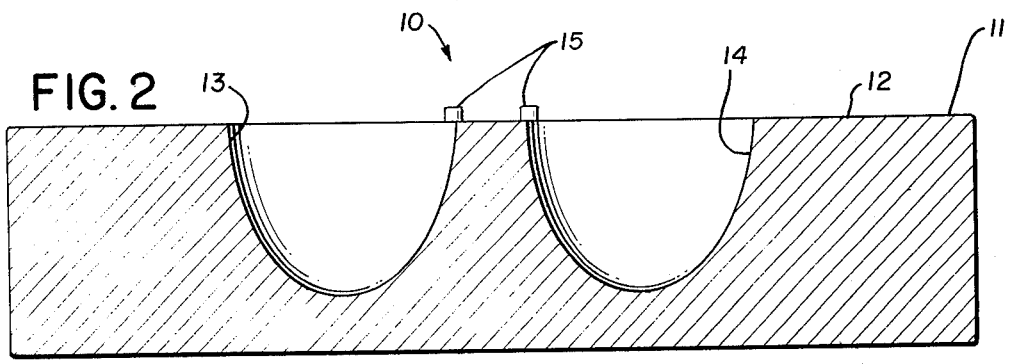
FIG. 2 is a vertical sectional view taken along line 2—2 in FIG. 1.

A first form of egg holder 10 is illustrated in FIGS. 1 and 2, and comprises a solid base 11 of wood or metal or plastic or other suitable material having a substantially flat upper surface 12, with a pair of hemiellipsoidal sockets or depressions 13 and 14 therein, each of a size and shape such as to receive and hold one end half of an egg or the like therein.

Suitable egg supporting and holding means, such as four upstanding projections or prongs 15 extend upwardly from the upper surface 12 closely adjacent to and between the depressions 13 and 14, on which an egg may be placed and supported for cutting the egg, whereby each end half of the egg will fall into a respective depression 13 and 14.

Figure 3:
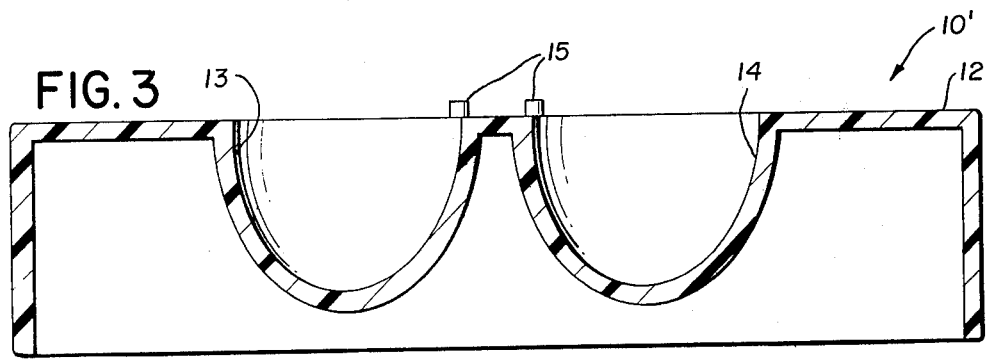
FIG. 3 is a vertical sectional view of a modified form of egg holder.

A modified egg holder 10' is illustrated in FIG. 3, and in this form of the invention the base 11 is made from a sheet of metal or molded plastic or the like, so that it is hollow underneath. In all other respects this form of the invention is similar to that in FIGS. 1 and 2, in that it includes a substantially flat upper surface 12 having at least one pair of spaced depressions 13 and 14 therein and upstanding egg supporting projections 15.

The egg cutting board could have more than one pair of depressions therein, and other suitable means for supporting the egg rather than the projections 15 could be provided, if desired. Moreover, the egg cutting board could be made from a solid block of wood or other suitable material or molded or stamped from a continuous sheet of metal, plastic or other suitable material as desired.

Thus, with the present invention an egg can be removed from boiling water with a spoon or other utensil and placed on the egg cutting board in supported relationship on the projections 15, and the egg can then be cut with a sharp knife or the like, whereby the opposite end halves thereof will fall into the respective egg-size depressions or sockets 13 and 14 in an upright position, with little or no loss of yolk. With the invention, the egg will not roll around and it is not necessary to grip the egg with the fingers, which could be difficult to do if the egg is hot.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall

What is claimed is:

1. A kitchen utensil for cutting hard or soft boiled eggs and the like, comprises a base having a substantially flat upper surface, said surface has at least one pair of spaced apart depressions therein each having a size and shape to receive therein one end half of an egg and the like, and a plurality of projections extend upwardly from the surface between the pair of depressions to support an egg and the like thereon, so that when the egg and the like is cut substantially in the middle thereof, one end half thereof falls into each depression of the pair.

2. A kitchen utensil as in claim 1, wherein only one pair of depressions is in the upper surface of the base.

3. A kitchen utensil as in claim 1, wherein the base comprises a block of wood.

4. A kitchen utensil as in claim 1, wherein the base comprises a molded sheet of plastic with the depressions and upwardly extending projections molded therein.

5. A kitchen utensil as in claim 1, wherein the base comprises a substantially rectangular block of wood, having a single pair of depressions in the upper surface thereof, and there are four upstanding projections spaced between the depressions for supporting an egg thereon.

6. A kitchen utensil as in claim 1, wherein the base is stamped from a sheet of metal.

* * * * *